(12) United States Patent
Guarnieri et al.

(10) Patent No.: US 12,280,377 B2
(45) Date of Patent: Apr. 22, 2025

(54) SURFACE BIO-CONTAMINATION ASSAY KIT

(71) Applicants: Thales Alenia Space Italia S.p.A. Con Unico Socio, Rome (IT); GL Biocontrol S.A.R.L., Clapiers (FR)

(72) Inventors: Vincenzo Guarnieri, Turin (IT); Ilaria Locantore, Turin (IT); Cesare Lobascio, Turin (IT); Clement Faye, Clapiers (FR); Laurent Garrelly, Clapiers (FR)

(73) Assignees: Thales Alenia Space Italia S.p.A. Con Unico Socio, Rome (IT); GL Biocontrol S.A.R.L., Clapiers (FR)

( * ) Notice: Subject to any disclaimer, the term of this patent is extended or adjusted under 35 U.S.C. 154(b) by 1053 days.

(21) Appl. No.: 17/281,894

(22) PCT Filed: Oct. 3, 2019

(86) PCT No.: PCT/IB2019/058433
§ 371 (c)(1),
(2) Date: Mar. 31, 2021

(87) PCT Pub. No.: WO2020/070691
PCT Pub. Date: Apr. 9, 2020

(65) Prior Publication Data
US 2021/0394175 A1 Dec. 23, 2021

(30) Foreign Application Priority Data

Oct. 3, 2018 (IT) .......................... 102018000009137
Jul. 25, 2019 (IT) .......................... 102019000012897

(51) Int. Cl.
*B01L 3/00* (2006.01)
*G01N 1/02* (2006.01)
*G01N 21/76* (2006.01)

(52) U.S. Cl.
CPC .............. *B01L 3/5029* (2013.01); *G01N 1/02* (2013.01); *G01N 21/763* (2013.01);
(Continued)

(58) Field of Classification Search
CPC .............. B01L 3/5029; B01L 2200/04; B01L 2300/069; G01N 1/02; G01N 2001/028; G01N 2001/065

See application file for complete search history.

(56) References Cited

U.S. PATENT DOCUMENTS 3,841,973 A 10/1974 Wilkins et al.
2002/0018986 A1 2/2002 Dicesare
(Continued)

OTHER PUBLICATIONS

PCT International Search Report and Written Opinion dated Nov. 5, 2019 for PCT/IB2019/058433.

*Primary Examiner* — Jill A Warden
*Assistant Examiner* — Dwayne K Handy
(74) *Attorney, Agent, or Firm* — McCarter & English, LLP (57) ABSTRACT

A surface bio-contamination assay kit (1) comprising a disposable swab cartridge (2) comprising a swab (29); a sampler (3) designed to removably receive the cartridge (2) and to wipe the cartridge swab (29) on a surface to be collect a sampled, along a predetermined sampling path (4) designed to cover a predetermined surface area; and a bio-contamination meter (5) designed to removably receive the cartridge (2) after sampling and to measure bio-contamination of the collected sample on the cartridge (2).

17 Claims, 8 Drawing Sheets

(52) U.S. Cl.
CPC ..... *B01L 2200/04* (2013.01); *B01L 2200/141* (2013.01); *B01L 2300/042* (2013.01); *B01L 2300/0663* (2013.01); *B01L 2300/069* (2013.01); *B01L 2300/168* (2013.01); *G01N 2001/028* (2013.01)

(56) References Cited

U.S. PATENT DOCUMENTS

| | | |
|---|---|---|
| 2014/0004548 A1 | 1/2014 | Brinckerhoff et al. |
| 2017/0028401 A1 | 2/2017 | Marion, Jr. |

FIG. 16

SURFACE BIO-CONTAMINATION ASSAY KIT

CROSS-REFERENCE TO RELATED PATENT APPLICATIONS

This patent application is a 35 U.S.C. § 371 National Stage filing of International Application No. PCT/IB2019/058433 filed on Oct. 3, 2019, which application claims priority from Italian Patent Application No. 102018000009137 filed on Oct. 3, 2018 and Italian Patent Application No. 102019000012897 filed on Jul. 25, 2019, the contents of which are incorporated herein by reference.

TECHNICAL FIELD

The present invention relates in general to a surface bio-contamination assay kit, and in particular to an assay kit comprising a disposable swab cartridge, a sampler to removably receive the cartridge and wipe the cartridge on a surface to be sampled along a predetermined sampling path designed to cover a predetermined surface area, and a bio-contamination meter to removably receive the cartridge after sampling.

The surface bio-contamination assay kit of the present invention may be employed for microbiological test of surfaces in several industrial application fields, such as food & beverages, pharma, cosmetics. Other fields of advantageous application of the assay kit of the present invention include humanitarian applications, such as civil protection and anti-bioterrorism, health applications, and scientific research applications, in particular human spaceflight and planetary exploration.

STATE OF THE ART

Many ATP-based bio-contamination assay kits have been developed over the years to detect and quantify biomass on solid surfaces for contamination monitoring purpose. ATP-based assay kits are, for example, commonly used for hygiene monitoring in food industry and clinical settings. It could also be used in spacecraft, where detection and mitigation of the microbiological contamination is mandatory.

Generally, ATP-based bio-contamination assay kits use bioluminescence to indicate the level of residual adenosine triphosphate (ATP) present on swabbed surfaces. Once the surface is swabbed, the sample is exposed to an ATP-releasing agent and to an ATP-activated light-producing substrate and enzyme (luciferin and luciferase). The bioluminescent reaction of ATP with luciferin-luciferase results in light being emitted and then detected by a luminometer and quantified in Relative Light Unit (RLU).

The amount of ATP present on the surfaces sampled can then be quantified by the amount of light emitted during the enzymatic reaction. Since ATP is present in all living cells, including all microbial cells, this method can provide a rapid assay to obtain a quantitative estimate of the number of organic matter and, consequently, of microbial contamination in the sample.

ATP-based bio-contamination assays have proven to be a very powerful tool for the bio-surface contamination detection and measurement because it is cost effective, combines quantitative data collection with scientific measurement, and provides real-time results.

US 2014/004548 A1 discloses an apparatus for evaluating the quality of an environment or process by measuring light emitted from a bioluminescent sample containing ATP, ADP, or alkaline phosphatase. The apparatus comprises a sample collection and bioluminescent analysis system used to collect a sample, mix reagents, react the sample, and collect it in a measurement chamber. The system includes an instrument having a photon detection assembly for use with the sample testing device and one or more probe assemblies that optically cooperate with the instrument. The instrument includes a dark chamber with a reflective interior surface which may be concave or preferably spherical, and a photon detection sensor such as a multi-pixel photon counter sensor. A substantially transparent portion of the probe assembly, and liquid contained therein, focus bioluminescence toward the photon detection sensor.

US 2002/018986 A1 discloses a method to detect the presence of potentially inhibitory species that could interfere with a chemiluminescent assay procedure for determination of an analyte of interest. A surface to be analysed for the presence of an analyte of interest is first sampled by wiping the surface with a polymeric sampling swab. The sample thus obtained is mixed with a known amount of the analyte of interest and the chemiluminescence generated by a reaction with a suitable reactant system is measured. The resultant emission level is then compared with the expected level of emission based on the known amount of the analyte of interest mixed with the sample. If the emission level is below that expected based on the known amount of analyte, then the sampled surface is contaminated with inhibitory species.

U.S. Pat. No. 3,841,973 A discloses an automatic apparatus for microbiologically sampling surfaces using a cotton swab which eliminates human error normally associated with this process. The apparatus includes a self-powered transport device, such as a motor-driven wheeled cart, which mounts a swabbing motor drive for a crank arm which supports a swab in the free end thereof. The swabbing motor is pivotably mounted and an actuator rod movable responsive to the cart traveling a predetermined distance provides lifting of the swab from the surface being sampled and reversal of the direction of travel of the cart.

SUMMARY OF THE INVENTION

Space exploration requires development of more reliable, rapid, significant, and safe methods for preventing and monitoring bio-contamination within human confined environments.

Under the Horizon 2020 programme, the Biowyse Project of a European-wide consortium, in which the Applicant is involved, deals with an integrated bio-contamination control system of wet systems (water and humid areas) for space exploration habitat.

The main goal of the Biowyse Project is the development of compact, integrated solution (hardware & software) and operational method for preventing, monitoring and mitigating the microbial contamination risk in water systems and humid surfaces on board International Space Station (ISS) and in future human space exploration missions.

The Applicant has noted that, despite their advantages, the known ATP-based bio-contamination assay kits fail to comply with the Biowyse Project requirements due to the fact that the surface sampling is to be performed manually using swabs and, therefore, requires operators' skill and time, is poorly repeatable, and is prone to cross contamination.

The Applicant has further noted that the sampling procedure and, in general, the actual absence of any standardization in known ATP-based bio-contamination assay kits introduce systematic errors and make the comparisons between measurements performed using different assay kits or by different operators or in different times rather difficult.

The object of the present invention is to improve the known ATP-based bio-contamination assay kits so as to enhance reliability of the surface biomass measurement, to simplify the sampling procedures, and to reduce operator time and skill needed.

According to the present invention, a surface bio-contamination assay kit and a cartridge therefor are provided, as claimed in the appended claims.

DETAILED DESCRIPTION OF PREFERRED EMBODIMENTS OF THE INVENTION

The following description is provided to enable a person skilled in the art to make and use the invention. Various modifications to the embodiments will be readily apparent to those skilled in the art, without departing from the scope of the claimed invention. Thus, the present invention is not intended to be limited to the embodiments shown, but is to be accorded the widest scope consistent with the principles and features disclosed herein and defined in the appended claims.

Unless otherwise defined, all technical and scientific terms used herein have the same meaning as commonly understood by one of ordinary skill in the art to which the embodiments disclosed belongs. In the case of conflict, the present specification, including definitions, will control. In addition, the examples are illustrative only not intended to be limiting.

For the purposes of promoting understanding of the embodiments described herein, reference will be made to certain embodiments and specific language will be used to describe the same. The terminology used herein is for the purpose of describing particular embodiments only, and is not intended to limit the scope of the present disclosure.

Figure 1:
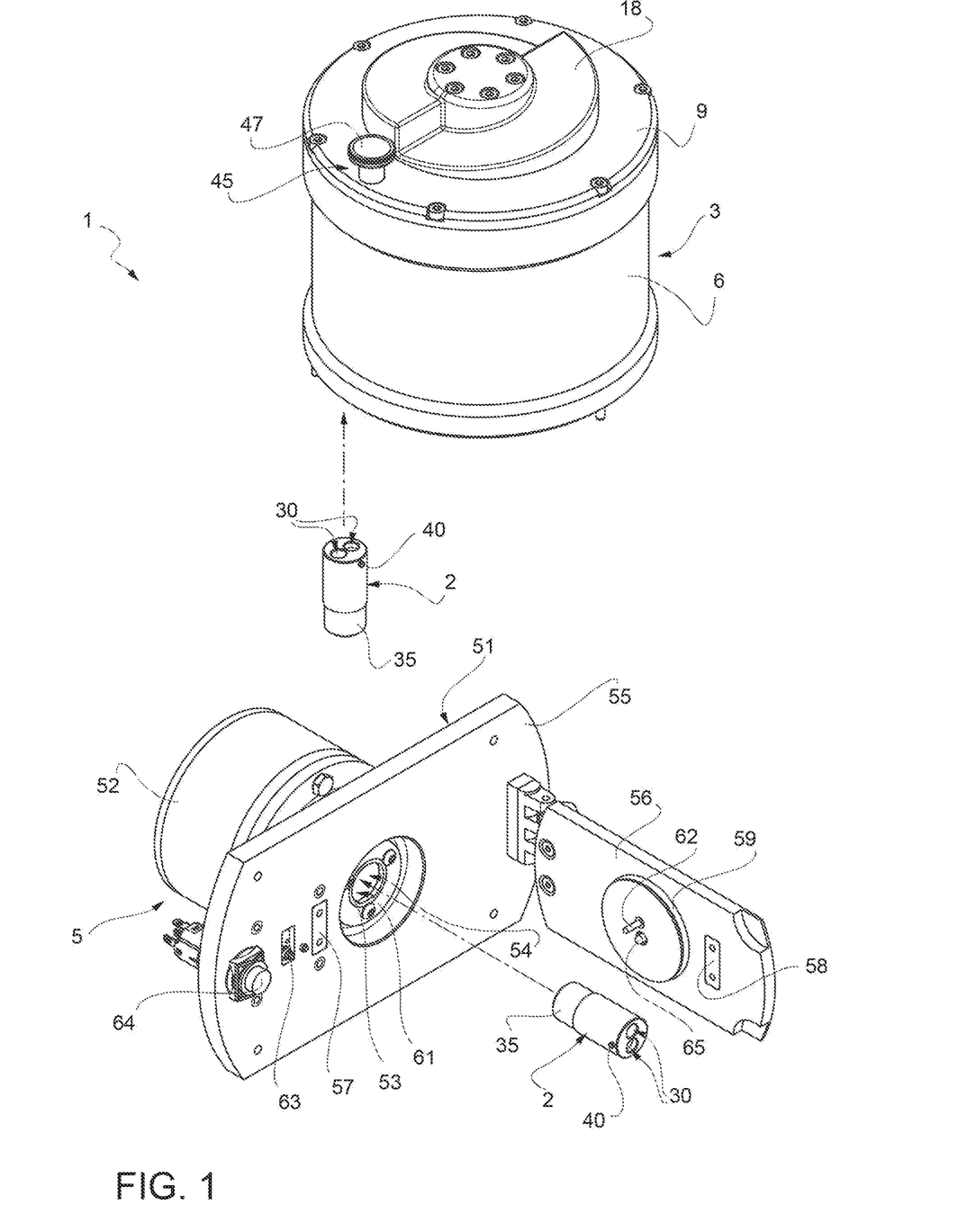
FIG. 1 is a perspective view of a preferred embodiment of the surface bio-contamination assay kit according to the present invention.

FIG. 1 shows a surface bio-contamination assay kit, referenced as a whole with reference numeral 1, useful for monitoring bio-contamination both in human confined environments (hospitals, food industry, etc.) and in space activities, to which the following description makes specific reference, without, however, losing generality.

Surface bio-contamination assay kit 1 is designed to address all those bio-contamination control and constructional requirements which have demonstrated to be necessary to provide a bio-contamination testing system adapted to monitor bio-contamination on humid surfaces on board ISS and in human space exploration missions.

Applicant's knowledge and experience show that the surface sampled must be more than 50 $cm^2$ to reach the limits of quantification (0.1 $pg/cm^2$, bio-contamination control requirement), and less than 100 $cm^2$ to respect maximum envelope size (size requirement).

As shown in FIG. 1, surface bio-contamination assay kit 1 comprises:
 a disposable cartridge 2 comprising a swab 29,
 a sampler 3 designed to removably receive cartridge 2 and wipe the swab 29 on a surface to collect a sample, along a predetermined sampling path 4 designed to cover a predetermined surface area, and
 a bio-contamination meter 5 designed to removably receive cartridge 2 after sampling and to measure bio-contamination of the collected sample.

Sampler 3 and bio-contamination meter 5 may be manufactured either as separate apparatuses or as a single apparatus.

In particular, FIG. 1 shows a preferred embodiment of the invention, in which sampler 3 and bio-contamination meter 5 are designed to be individually self-contained and stand-alone, namely having or containing all that is necessary to perform the functions for which they are designed and being able to operate without having to be connected to external resources.

Therefore, sampler 3 and bio-contamination meter 5 are designed to be provided with such hardware and software resources to be able to operate alone, independently and autonomously, without requiring external hardware/software resources.

Figure 2:
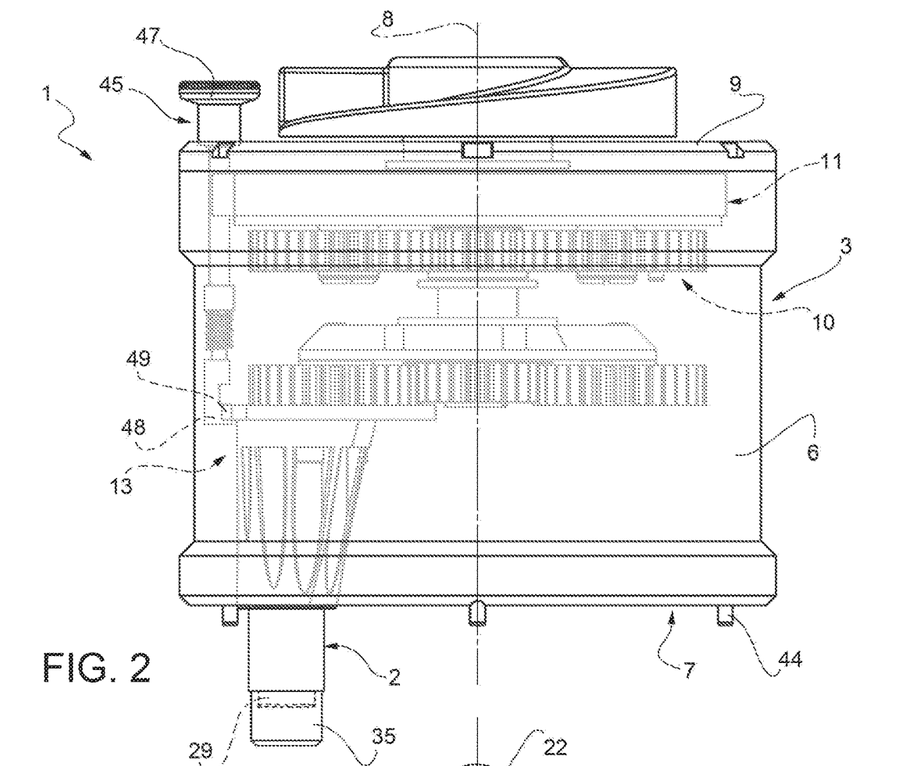
FIG. 2 is a lateral elevation view, with see-through parts, of a cartridge attached to a sampler forming part of the assay kit of FIG. 1.

As shown in FIG. 2, sampler 3 comprises a casing 6 having an open bottom 7. Preferably, casing 6 comprises a hollow body, in the example shown in the form of a cylinder, having a longitudinal axis 8 and a top closed by a cover 9.

Casing 6 is also designed to be steadily placeable on the surface to be sampled. To this end, casing 6 is conveniently provided with three (or more) support pins 44 connected to a bottom edge of casing 6. In this manner, the contact area between casing 6 and the surface to be sampled is very limited and, consequently, the risk is reduced that surface's bacteria contaminate sampler 3 and that contamination is spread to clean surfaces.

Sampler 3 further comprises a cartridge actuator 10 operable to move cartridge 2 along sampling path 4, and comprising a drive unit 11, a gear transmission 12, and a cartridge connection interface 13 connected to a rotary motion output of gear transmission 12 to couple cartridge 2 to drive unit 11.

In the embodiment depicted in the attached Figures, drive unit 11 is designed as a spring-powered drive unit, and gear transmission 12 is designed as a planetary gear transmission designed to cause cartridge 2 to perform, in response to the thrust of the spring-powered drive unit, a hypocycloid swab trajectory while rolling around itself so as to cover the entire sampling surface several times.

Figure 3:
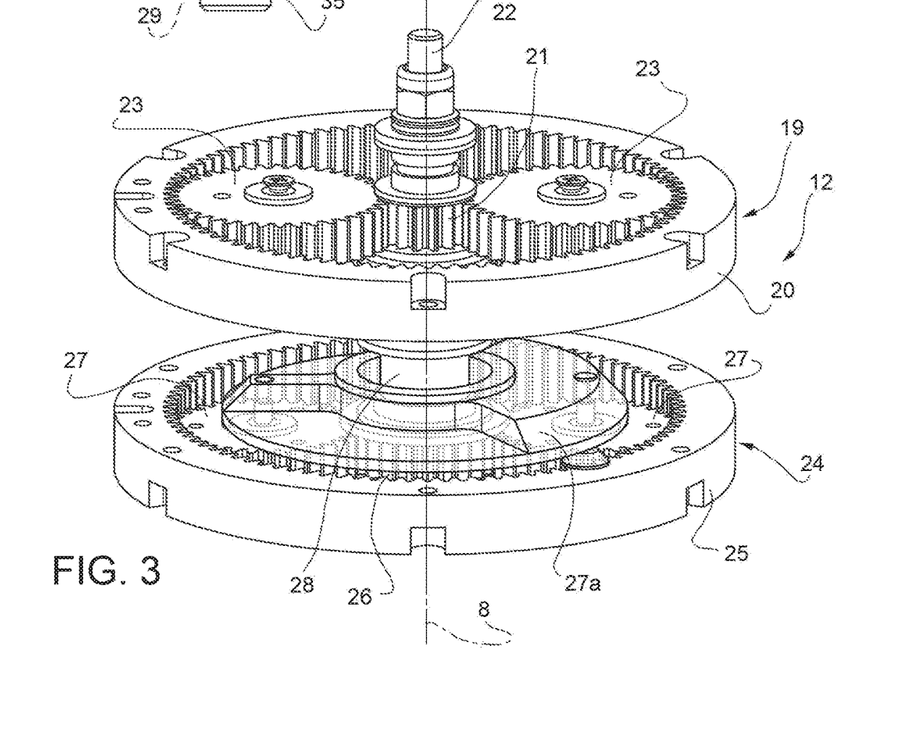
FIG. 3 is an exploded view of a planetary gear transmission of the sampler of FIG. 1.
Figure 4:
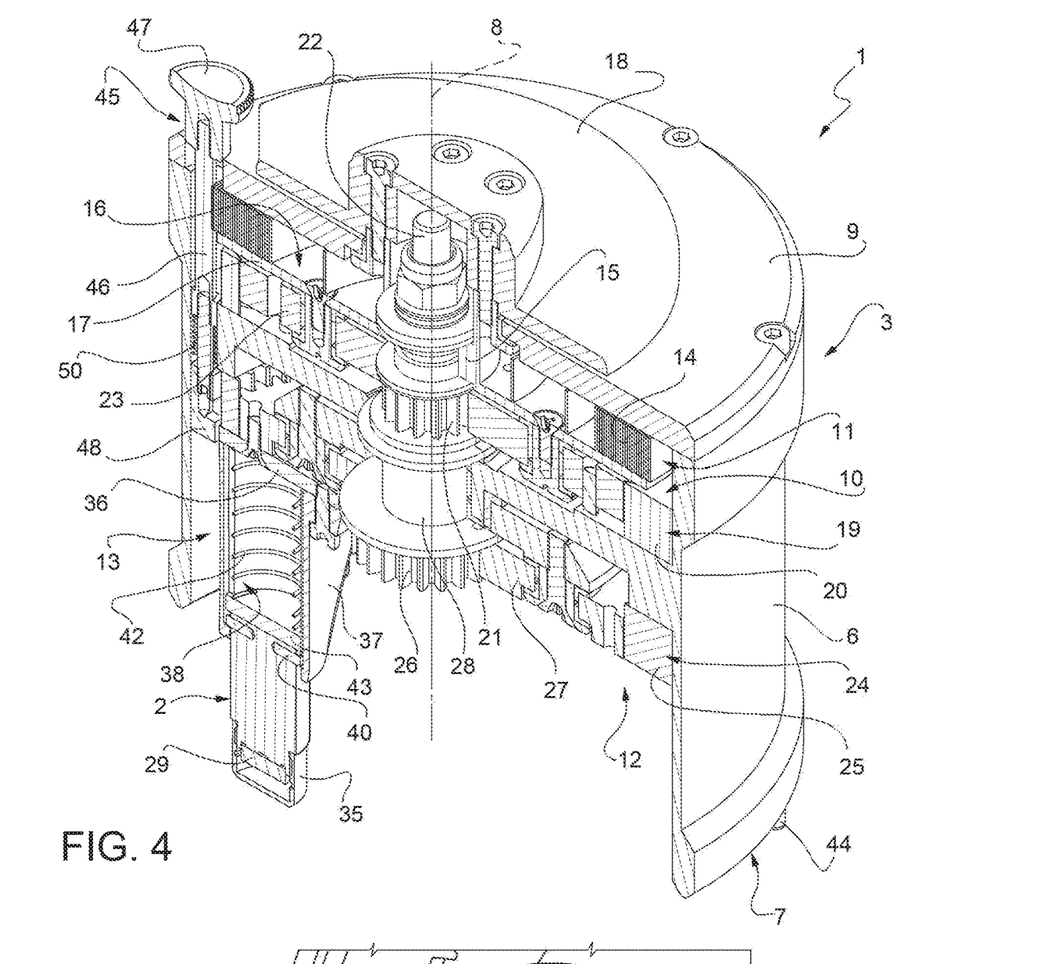
FIG. 4 is a partial sectional perspective view of the assembly of FIG. 2.

As shown in FIGS. 2, 3, and 4, spring-powered drive unit 11 comprises a mainspring 14, which is arranged inside casing 6, has an outer end coupled to a fixed spring mounting post (not shown), and is wound about a hub portion 15 of a rotary member 16 coaxial with axis 8.

Rotary member 16 further comprises a disc 17 which extends transversal to axis 8 under cover 9 to form therewith an annular seat for mainspring 14 around hub portion 15.

Drive unit 11 further comprises a rotary knob 18 mounted on cover 9 coaxially with axis 8, and coupled, preferably by screws, to hub portion 15, so that when, during operation, a user turns knob 18, hub portion 15 is consequently turned about axis 8, causing energy to be stored in mainspring 14 by twisting the spiral tighter.

Conveniently, planetary gear transmission 12 comprises two planetary trains.

The first stage of planetary gear transmission 12 comprises a top planetary train 19 including a fixed ring gear 20 coaxial with axis 8, and having an internal toothing; a sun gear 21 coaxial to axis 8 and press-fitted on a central shaft 22; and two planet gears 23 meshing with both ring gear 20 and sun gear 21.

Planet gears 23 are carried by disc 17 by means of journals and bearings, so as to be constrained to rotate together with disc 17 about axis 8, and to be free to rotate around their longitudinal axes during revolution about axis 8.

The second stage of planetary gear transmission 12 comprises a bottom planetary train 24 including a fixed ring gear 25 coaxial with axis 8 and having an internal toothing; a sun gear 26 coaxial to axis 8; and two planet gears 27 meshing with both ring gear 25 and sun gear 26, and carried by a support disc 27a rotatably mounted on shaft 22.

Sun gear 26 is angularly coupled to sun gear 21 via a freewheel 28 fitted on a bottom end of shaft 22 in order to transmit torque in one direction and allow idling in the opposite direction. In practice, freewheel 28 connects top planetary train 19, which is linked to mainspring 14, to bottom planetary train 24 in such a manner that, when a user is winding mainspring 14 by turning knob 18, freewheel 28 fails to transmit the rotation movement to bottom planetary train 24, and, when mainspring 14 unwinds, freewheel 28 transmits the rotation movement to bottom planetary train 24 and, hence, to cartridge 2.

Figure 8:
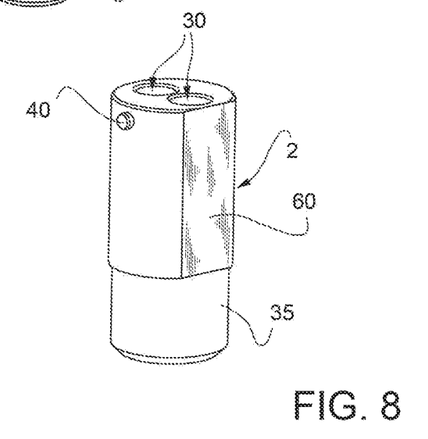
FIG. 8 is a perspective view of the cartridge of FIG. 1.
Figure 11:
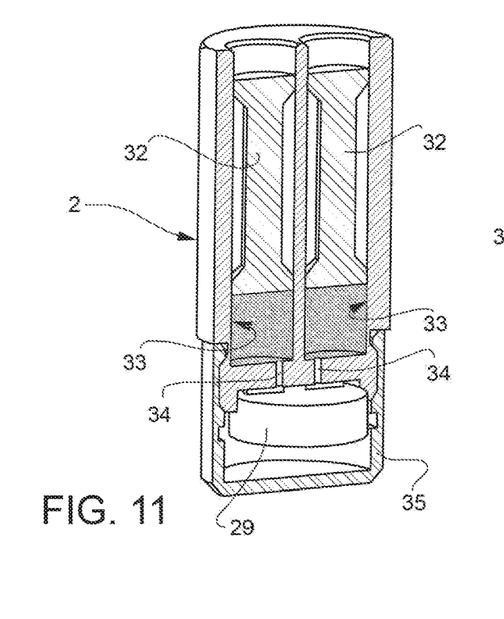
FIGS. 11 and 12 are sectional perspective views of the cartridge of FIG. 8 in two different operating configurations.
Figure 12:
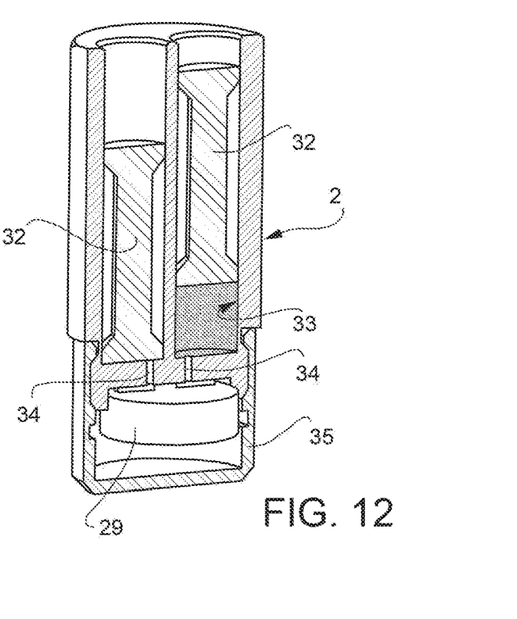

As shown in FIGS. 8, 11 and 12, cartridge 12 comprises a body, preferably cylindrical, which carries, at an axial end thereof, swab 29, and exposes, at the opposite axial end, two holes 30 extending axially along the body up to a transversal partition wall 31 dividing holes 30 from swab 29.

Each hole 30 is slidably engaged by a respective piston 32, an axial end thereof forms, with partition wall 31, a respective chamber 33 for a reagent. In particular, one chamber 33 contains Dendridiag®, and the other chamber 33 contains a Standard ATP reagent. As it will be explained hereinafter, reagents are able to pass from respective chambers 33 to swab 29 when pistons 32 are pulled down to force reagents into through holes 34 provided in partition wall 31.

Preferably, swab 29 is permanently glued to cartridge 2 and is intended to be used for only one sampling, just like the reagents into chambers 33. It follows that cartridge 2 is a disposable cartridge.

Conveniently, swab 29 is made of a material transparent or translucent to bioluminescence, in order to perform the bioluminescence measurement in bio-contamination meter 5. Preferably, swab 29 is designed as a polymer cylinder, preferably made of melamine or polycationic sponge.

In order to protect swab 29 from external bacteria when the operator is handling cartridge 2, cartridge 2 is provided with a hollow cap 35 designed to be removably coupled to the axial end of cartridge 2 that carries swab 29. Moreover, as sampling is more efficient if swab 29 is pre-moistened by an extractant, cap 35 is designed to hold a predetermined amount of extractant adapted to soak swab 29.

Cap 35 is removed from cartridge 2 only during the sampling and coupled again to cartridge 2 before cartridge 2 is extracted from sampler 3 and coupled to meter 5. Indeed, as it will be more clear later on, cap 35 also serves as a reagent chamber, in which the Dendridiag® and the Standard ATP reagent are mixed before the bioluminescence measurement. For this purpose, cap 35 is preferably made of polypropylene transparent to bioluminescence.

As shown in FIGS. 4 to 7 and 9 to 10, cartridge 2 is removably connected to one of the two planet gears 27 via connection interface 13, which, to this purpose, comprises a mounting plate 36 screwed to a planet gear 27, and a cartridge holder 37 fixed, preferably by screws, to mounting plate 36. Cartridge holder 37 is designed as a tubular piece having a hole 38 parallel to, and offset (FIG. 5) relative to, the rotation axis of planet gear 27 (which is parallel to axis 8).

Figure 9:
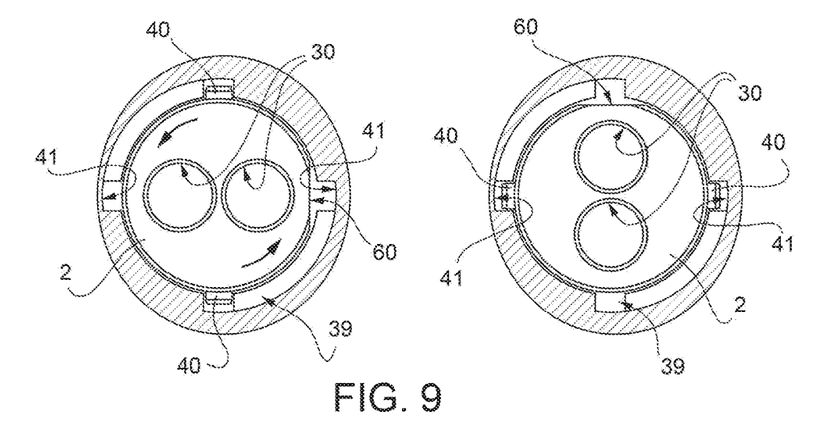
FIG. 9 is a bottom elevation view of the assembly of FIG. 6 in two different mounting configurations.
Figure 10:
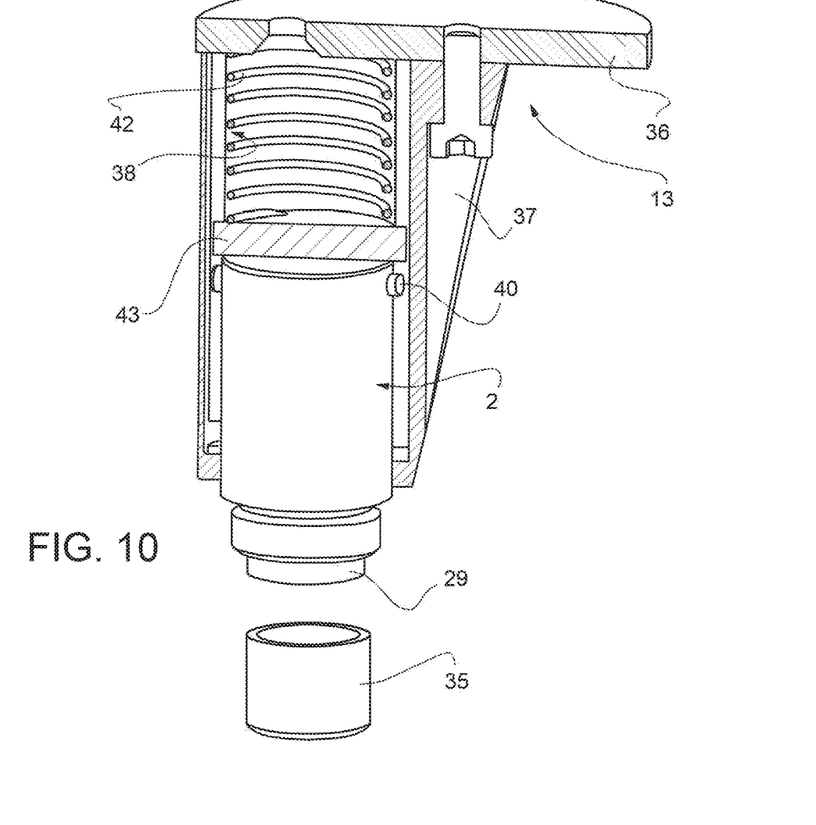
FIG. 10 is a partial sectional perspective view of the assembly of FIG. 6.

To removably mount cartridge 2 on cartridge holder 37, a bayonet fitting 39 is provided in hole 38 adapted to be engaged by two pins 40 projecting transversally from the body of cartridge 2. Bayonet fitting 39 allows a simple and rapid mounting of cartridge 2, as shown in FIG. 9, and prevent, during sampling, angular movement between cartridge 2 and cartridge holder 37. Once mounted, cartridge 2 is, on the other hand, free to slide up and down along hole 38 thanks to two longitudinal grooves 41 formed in an inner surface of hole 38, in communication with bayonet fitting 39, and slidably engaged by pins 40.

Moreover, in order to maintain cartridge 2 pushed on the surfaces to be sampled during the whole sampling process, cartridge holder 37 further comprises a coil spring 42 arranged into hole 38, between mounting plate 36 and a spring holder 43 extending transversally across hole 38.

Coil spring 42 is designed to normally maintain cartridge 2 in an extracted inoperative position (FIGS. 2 and 4), in which cartridge 2 projects for most of its length outside hole 38, and to urge cartridge 2 down by means of spring holder 43 when cartridge 2 is in a retracted sampling position (FIGS. 7 and 10), in which casing 6 is placed on the surface to be sampled and swab 29 is pressed on the surface to be sampled.

In this connection, it is may be appreciated that, in sampling position, swab 29 projects outside bottom 7 of casing 6, and casing 6 stands on support pins 44 connected to the bottom edge of casing 6. In this manner, the contact area between casing 6 and the surface to be sampled is very limited and, consequently, the risk is reduced that surface's bacteria contaminate sampler 3 and that contamination is spread to clean surfaces.

Figure 5:
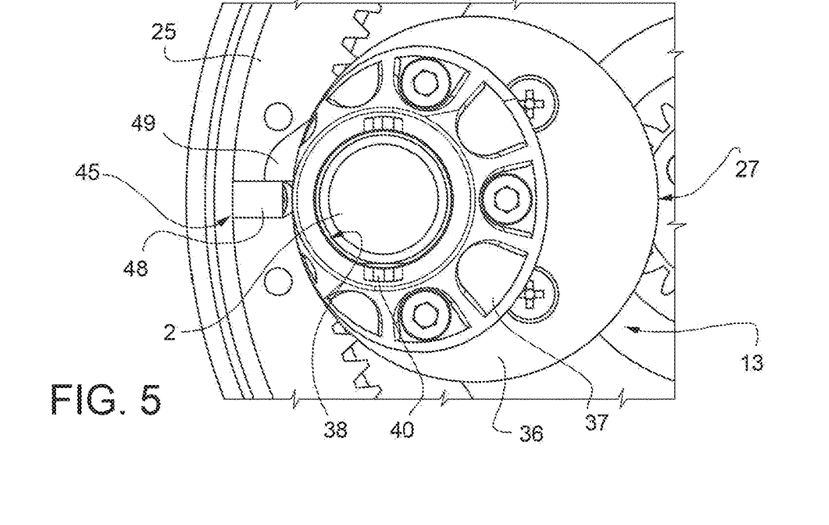
FIG. 5 is a bottom elevation view of a detail of the assembly of FIG. 2.
Figure 6:
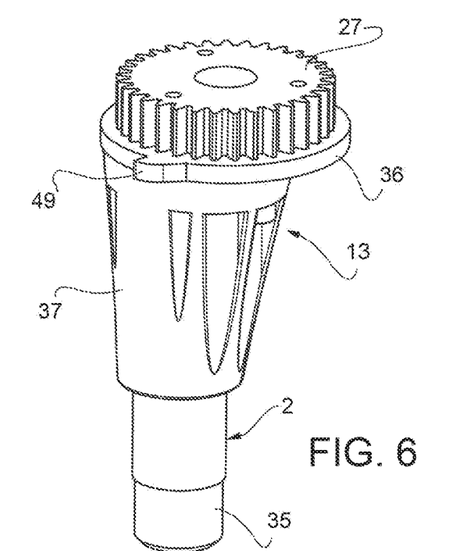
FIG. 6 is a perspective view of a detail of the assembly of FIG. 2.
Figure 7:
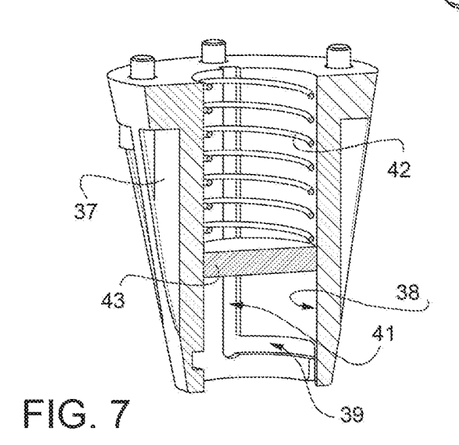
FIG. 7 is a sectional perspective view of a detail of FIG. 6.

With reference to FIGS. 4 and 5, in order to control operation of cartridge 2 and guarantee that swab 29 covers the entire surface area to be sampled, sampler 3 further comprises a mechanical stop 45, which is also serves as a mechanical start. Mechanical stop 45 comprises a rod 46 which is fitted on casing 6 parallel to axis 8 and is provided at a top axial end with a push-button 47, and at a bottom axial end with a transversal portion 48 designed to cooperate with a dog 49 protruding from a peripheral edge of mounting plate 36 of cartridge holder 37.

Mechanical stop 45 is spring loaded by a coil spring 50, which normally holds the mechanical stop 45 in a locking position, in which transversal portion 47 is coplanar to, and engages, dog 49 to prevent angular movement of cartridge holder 37. When push-button 47 is operated, mechanical stop 45 move downwards into an unlocking position, in which dog 49 is disengaged and the rotating movement of planet gear 27, and hence of cartridge 2, can start. Mechanical stop 45 is returned by coil spring 50 to the locking position and blocks planet gear 27 when it returns to the starting position.

Figure 13:
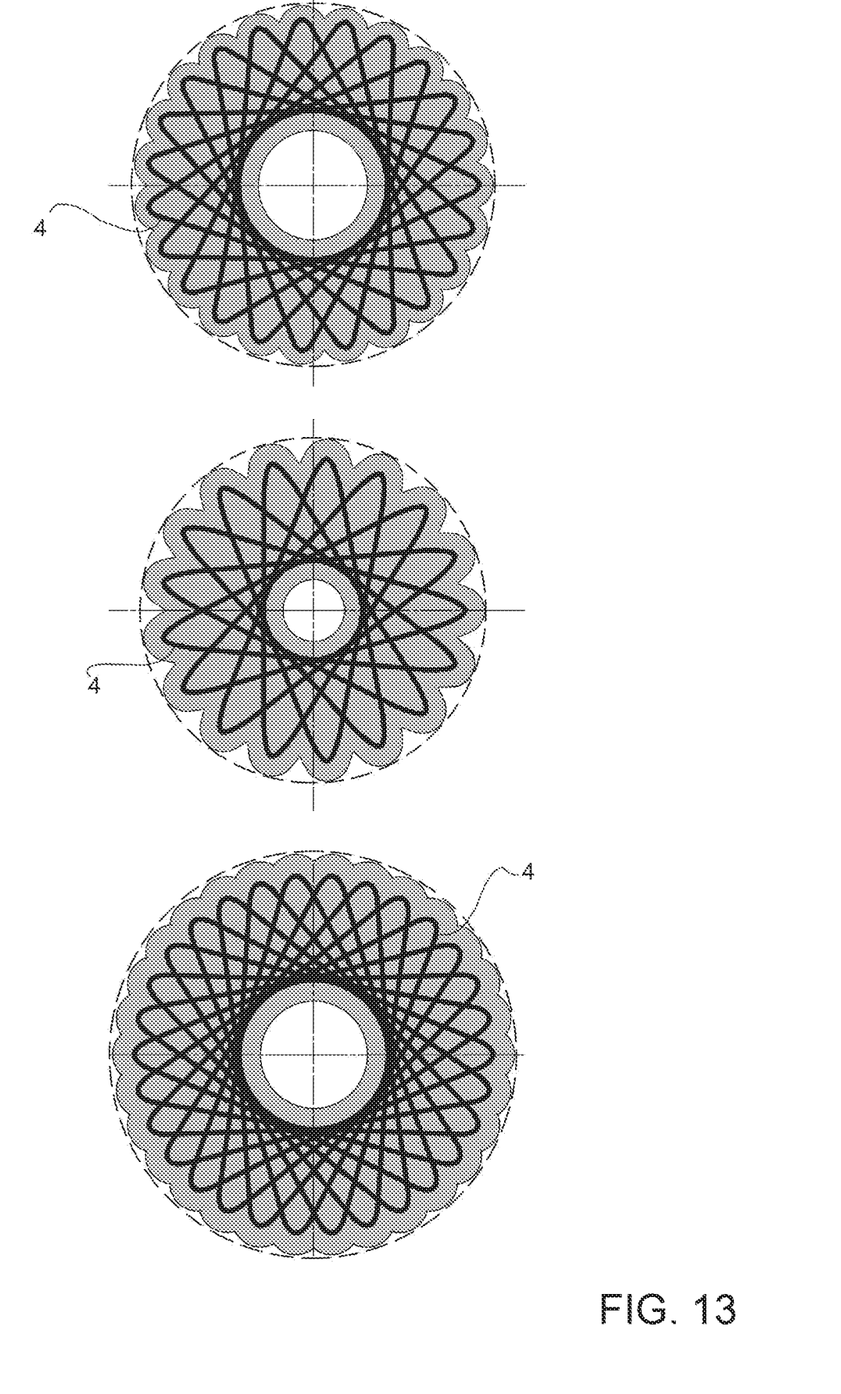
FIG. 13 shows examples of sampling paths of the cartridge of FIG. 8.
Figure 14:
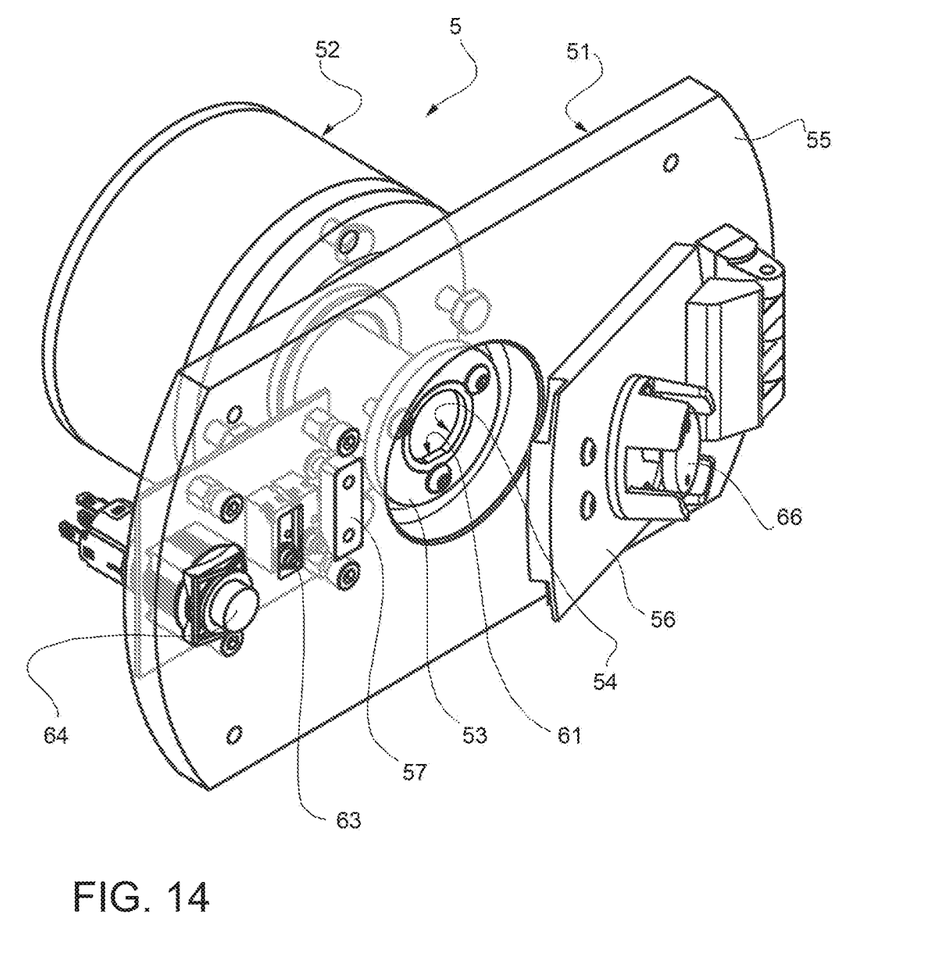
FIG. 14 is a perspective view of a bioluminescence meter of the assay kit of FIG. 1.

With regard to sampling path 4 performed by swab 29 during one sampling process, FIG. 13 shows three examples of sampling path 4 obtained using three differently sized samplers 3, and wherein the surface covered by swab 29 is coloured in grey, the black lines represent the hypocycloidal trajectory followed by swab 29, and the peripheral circle represents the primitive diameter of ring gear 25.

As shown in FIGS. 1, 14, 15 and 16, bio-contamination meter 5 comprises a cartridge receiver 51, and a biomass detector 52 connected to cartridge receiver 51, preferably by screws or any other appropriate connection. The ATP measurement is performed in the meter 5 using a photodiode. The bioluminescence reaction takes place in cap 35 containing swab 29. Indeed, as stated above, cap 35 serves as reagent mixing chamber and, being made of a material transparent or translucent to bioluminescence, the measurements can be performed directly on cap 35.

Figure 15:
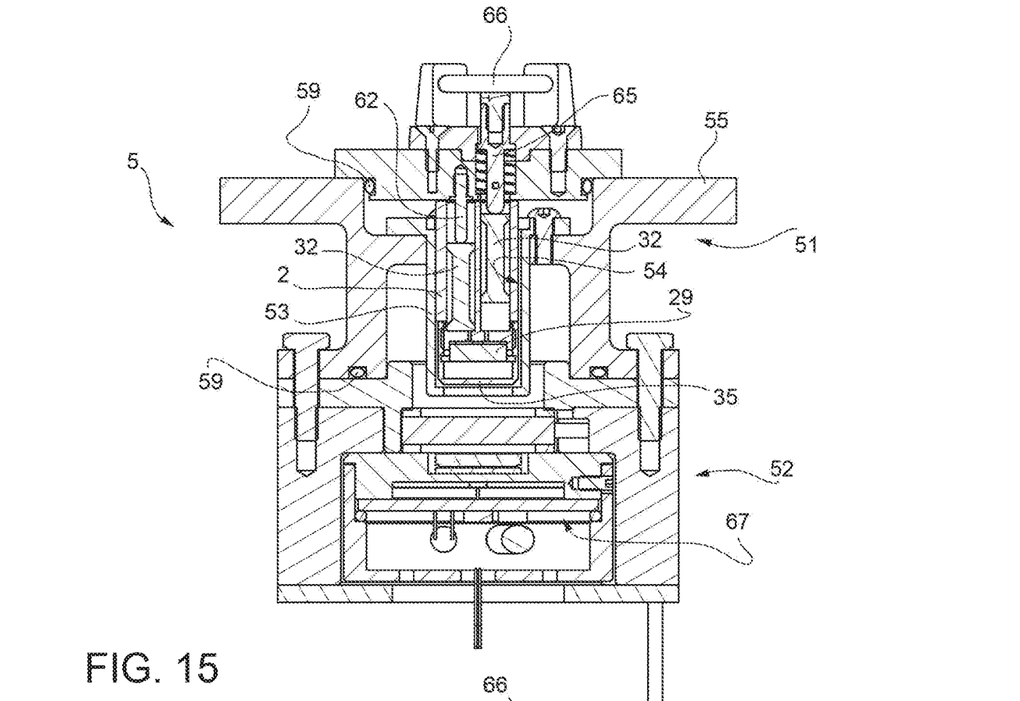
FIGS. 15 and 16 are sectional lateral views of the ATP-based bioluminescence meter of FIG. 14 fitted with the cartridge of FIG. 8, in two different operating configurations.
Figure 16:
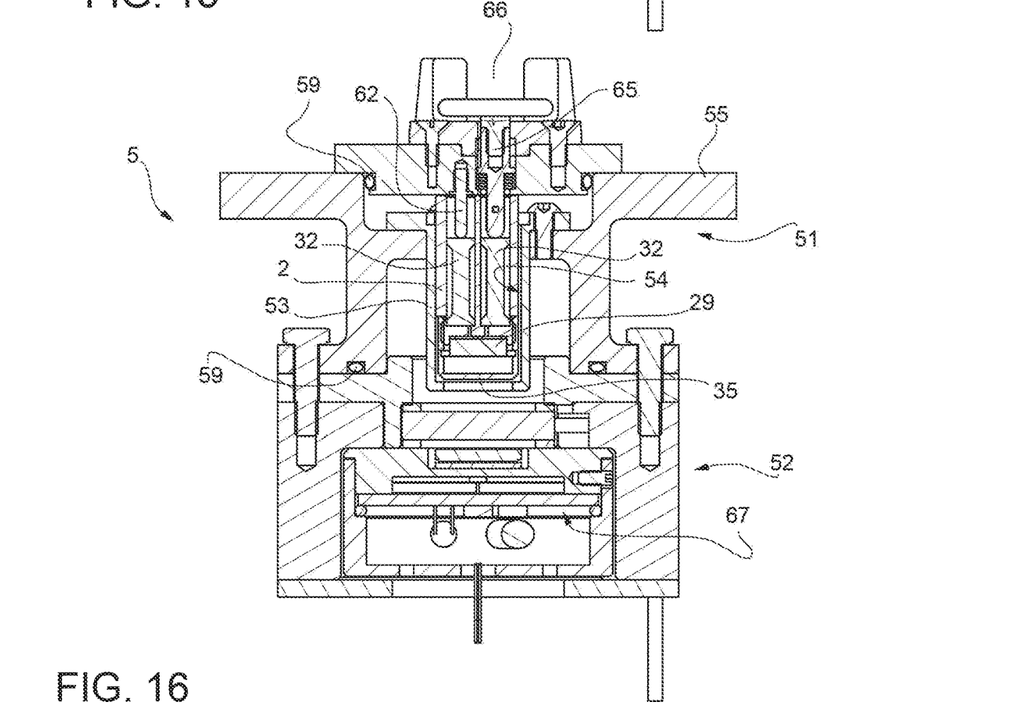

Cartridge receiver 51 comprises a tubular member 53 defining a measurement chamber 54 adapted to axially receive cartridge 2.

Cartridge receiver 51 further comprises a front panel 55 surrounding a cartridge inlet defined by an end of tubular member 53, and an access door 56, which is hinged to front panel 55 to move between an insertion open position, in which cartridge 2 may be plugged into tubular member 53, and a measurement closed position, in which door 56 engages front panel 55 and encloses cartridge 2 in measurement chamber 54.

Preferably, to properly keep door 56 closed on the measurement close position, a magnetic safe device is provided, which comprises a permanent magnet 57 fixed on front panel 55, and a permanent magnet 58 fixed on door 56 (FIG. 1).

Furthermore, to ensure a perfect light sealing that prevents light from entering measurement chamber 54 during bioluminescence measurement, two seals 59 surround measurement chamber 54, one of which is carried by door 56 to light seal the cartridge inlet, and the other one of which is arranged in a connection area between cartridge receiver 51 and biomass detector 52 (FIGS. 15 and 16).

After sampling and cap 35 has been put back on cartridge 2, cartridge 2 is inserted in measurement chamber 54 with cap 35 facing biomass detector 52.

As orientation of cartridge 2 plays an important role in the subsequent measurement phase, as it will becomes clear hereinafter, correct angular alignment of cartridge 2 into measurement chamber 54 is guaranteed by an insertion guiding system designed to cause cartridge 2 to be insertable in only one orientation.

Preferably, as shown in FIGS. 1 and 8, the insertion guiding system is mechanical and comprises a flat surface 60 formed in the outer surface of cartridge 2 and adapted to engage with a flat surface 61 formed in the inner surface of tubular member 53.

As shown in FIGS. 15 and 16, door 56 comprises a mechanical interface for the injection of reagents contained in chambers 33 into the reagent mixing chamber formed by cap 35.

The mechanical interface comprises a spike 62 projecting from the inside of door 56 to engage and push piston 32 in chamber 33 containing Dendridiag® in response to door 56 being closed, so as to cause the reagent to exit chamber 33 via respective through hole 34 and to impregnate swab 29 into cap 35 (FIG. 15).

A contact sensor 63 is provided on the front panel 55 in order to detect if door 56 is properly closed, and an illuminated switch 64 is provided to signal to the operator, by a green light, that measurement may be performed.

The mechanical interface comprises a further spike 65 projecting from the inside of door 56 to engage and push piston 32 in chamber 33 containing Standard ATP reagent in response to operation of a mechanical button 66 connected to spike 65 after a certain time span has lapsed from the injection of Dendridiag® into cap 35, so as to cause the reagent to exit chamber 33 via a respective through hole 34 and impregnate swab 29 into cap 35 (FIG. 16).

Given the importance of the sequence of injection of the reagents, preferably button 66 may be provided with a protection to avoid any injection mistakes when door 56 is closing. This protection can be, for example, a protective cage designed to be removed by operator before pushing button 66, or it can be a twist lock system.

After injection of regents, the ATP measurement is performed by a quantitative photodetector system 67 arranged in biomass detector 52, and comprising a quantitative photodetector to measure the surface biomass.

It may be appreciated that various modifications may be made to the above-described embodiment. In a different embodiment, drive unit 11 may be designed as an electrically-powered drive unit, and planetary gear transmission 12 may comprises one planetary stage only. Besides, mechanical stop 45 may be replaced with an electrical stop operable based on an output of an appropriately arranged position sensor.

The innovative aspects of the present invention allow the above-indicated drawbacks of the known ATP-based bio-contamination assay kits to be completely overcome by automating the sampling, so resulting in the sampling that is highly repeatable, low time consuming, and independent of the operators' skill, and in the measurements performed by different operators or in different times becoming reliably comparable.

Moreover, the sampler may be operated using only one operator's hand and also in the absence of any external electrical power source.

The invention claimed is:

1. A surface bio-contamination assay kit (1) comprising:
a cartridge (2) comprising a swab (29);
a bio-contamination meter (5) designed to removably receive the cartridge (2) after sampling and to measure bio-contamination of the collected sample; and
a sampler (3) comprising:
a casing (6) designed to be steadily placeable on a surface to be sampled;
a cartridge connection interface (13) arranged in the casing (6) and designed to removably receive the cartridge (2) such that the swab (29) may be come into contact with the surface to be sampled when the casing (6) is placed on the surface to be sampled; and
a cartridge actuator (10) arranged in the casing (6), coupled with the cartridge connection interface (13), and operable to cause the cartridge (2) to move along a predetermined sampling path (4), whereby, when the casing (6) is placed on the surface to be sampled, the swab (29) is caused to wipe on, and collect a sample of, an area of the surface to be sampled.

2. The surface bio-contamination assay kit (1) of claim 1, wherein the cartridge (2) further comprises:
a removable cap (35) designed to be transparent to bioluminescence, to be removably coupleable to the cartridge (2) to protect the swab (29), and to define a reagent mixing chamber;
first and second separate reagent compartments (33) designed to contain different reagents; and
first and second pistons (32) slidably arranged in the first and second reagent compartments (33) and operable to inject into the cap (35) the reagents contained in the first and second reagent compartments (33);
the bio-contamination meter (5) comprises a cartridge receiver (51) and a biomass detector (52) with at least one photodetector (67); the cartridge receiver (51) is designed to receive the cartridge (2) with the cap (35), and is provided with an injection apparatus (56, 62, 65, 66) designed to operate the first and second pistons (32) when the cartridge (2) is in the cartridge receiver (51) to cause the first and second pistons (32) to inject into the cap (35) the reagents contained in the first and second reagent compartments (33) in a predetermined sequence of injection, so as to cause a bioluminescence reaction to take place in the cap (35) and light emitted thereby to be captured by the photodetector (67).

3. Surface bio-contamination assay kit (1) of claim 1, wherein the cartridge actuator (10) comprises a drive unit (11), and a mechanical transmission (12) coupled between the drive unit (11) and the cartridge connection interface (13) to couple the cartridge (2) to the drive unit (11).

4. The surface bio-contamination assay kit (1) of claim 3, wherein the drive unit (3) comprises a manually loadable power spring or an electric motor.

5. The surface bio-contamination assay kit (1) of claim 3, wherein the mechanical transmission (12) is designed as a planetary gear transmission designed to cause the cartridge (2) to perform, in response to the thrust of the drive unit (11), a hypocycloid swab trajectory while rolling around itself, so as to cover the entire surface to be sampled.

6. The surface bio-contamination assay kit (1) of claim 5, wherein the planetary gear transmission (12) comprises at least one planetary train (24) including a fixed ring gear (25); a sun gear (26); and planet gears (27) meshing with both ring gear (25) and sun gear (26); the cartridge connection interface (13) is designed to couple the cartridge (2) to one planet gear (27) to result in the cartridge (2) being offset relative to a rotation axis of the planet gear (27).

7. The surface bio-contamination assay kit (1) of claim 5, wherein the planetary gear transmission (12) comprises two series-connected planetary trains (19, 24).

8. The surface bio-contamination assay kit (1) of claim 1, wherein the cartridge connection interface (13) comprises a cartridge holder (37) with a bayonet fitting (39) designed to removably hold the cartridge (2) so as to prevent, during operation, angular movements between the cartridge (2) and the cartridge holder (37), and to let the cartridge (2) to freely slide up and down into the cartridge holder (37), when the cartridge (2) is pressed against the surface to be sampled.

9. The surface bio-contamination assay kit (1) of claim 2, wherein the cartridge receiver (51) comprises a measurement chamber (54) designed to receive the cartridge (2), and the injection apparatus (56, 62, 65, 66) comprises a door (56) to close the measurement chamber (54), and a spike arrangement (62, 65) carried by the door (56) and designed to engage the first and second pistons (32).

10. The surface bio-contamination assay kit (1) of claim 9, wherein the spike arrangement (62, 65) comprises a first spike (62) projecting from the door (56) so as to engage the first piston (32) in the first reagent chamber (33) in response to door (56) being closed, and a second spike (65) projecting from the door (56) and operatively coupled to a button (66) to engage the second piston (32) in the second reagent chamber (33) in response to a manual operation of the button (66).

11. The surface bio-contamination assay kit (1) of claim 2, wherein the swab (29) and the first and second reagent chambers (33) are designed to result in the cartridge (2) being a single-use cartridge (2).

12. A sampling system, comprising:
a cartridge (2) comprising:
(i) a swab (29),
(ii) a removable cap (35) designed to be transparent to bioluminescence, to be removably coupleable to the cartridge (2) to protect the swab (29), and to define a reagent mixing chamber;
(iii) first and second reagent compartments (33) designed to contain different reagents; and
(iv) first and second pistons (32) slidably arranged in the first and second reagent compartments (33) and operable to inject into the cap (35) the reagents contained in the first and second reagent compartments (33), and
a sampler (3), comprising:
(i) a casing (6) designed to be steadily placeable on a surface to be sampled;
(ii) a cartridge connection interface (13) arranged in the casing (6) and designed to removably receive the cartridge (2) such that the swab (29) may be come into contact with the surface to be sampled when the casing (6) is placed on the surface to be sampled; and
(iii) a cartridge actuator (10) arranged in the casing (6), coupled with the cartridge connection interface (13), and operable to cause the cartridge (2) to move along a predetermined sampling path (4), whereby, when the casing (6) is placed on the surface to be sampled, the swab (29) is caused to wipe on, and collect a sample of, an area of the surface to be sampled.

13. The sampling system of claim 12, further comprising a body which carries, at an axial end thereof, the swab (29), and exposes, at an opposite axial end, two holes (30) extending axially along the body up to a transversal partition wall (31) which divides the holes (30) from the swab (29); each hole (30) is slidably engaged by a respective piston (32), an axial end thereof forms, with the partition wall (31), a respective reagent chamber (33), which is in fluid communication with the respective hole (30) via a respective through hole (34) formed in the partition wall (31);
whereby the first and second pistons (32), when operated, cause the reagents to flow from the respective reagent chambers (33) to the swab (29) via the through holes (34).

14. The sampling system of claim 12, wherein the body of the cartridge (2) further comprises, at its axial end opposite to the swab (29), two pins (40) projecting transversally from the body of cartridge (2) and designed to engage a bayonet fitting (39) of the cartridge connection interface (13) of the sampler (3) to cause the cartridge (2) to be received in the sampler (3).

15. The sampling system of claim 12, further comprising an insertion guiding system (60) designed to cause cartridge (2) to be insertable in a bio-contamination meter (5) in only one predetermined orientation.

16. The sampling system of claim 15, wherein the insertion guiding system (60) comprises a flat surface (60) formed in an outer surface of the cartridge (2) and designed to engage a flat surface (61) formed in an inner surface of the cartridge receiver (51) of the bio-contamination meter (5).

17. The sampling system of claim 12, wherein the swab (29) and the first and second reagent chambers (33) are designed to result in the cartridge (2) being a single-use cartridge (2).

* * * * *